United States Patent
Suetsugu

(10) Patent No.: US 12,273,692 B2
(45) Date of Patent: Apr. 8, 2025

(54) PUBLIC ADDRESS DEVICE, HOWLING SUPPRESSION DEVICE, AND HOWLING SUPPRESSION METHOD

(71) Applicant: TOA Corporation, Hyogo (JP)

(72) Inventor: Toshimitsu Suetsugu, Hyogo (JP)

(73) Assignee: TOA CORPORATION, Hyogo (JP)

(*) Notice: Subject to any disclaimer, the term of this patent is extended or adjusted under 35 U.S.C. 154(b) by 224 days.

(21) Appl. No.: 18/010,842

(22) PCT Filed: Jul. 9, 2020

(86) PCT No.: PCT/JP2020/026906
§ 371 (c)(1),
(2) Date: Dec. 16, 2022

(87) PCT Pub. No.: WO2022/009398
PCT Pub. Date: Jan. 13, 2022

(65) Prior Publication Data
US 2023/0254640 A1   Aug. 10, 2023

(51) Int. Cl.
H04R 3/02        (2006.01)
H04R 3/04        (2006.01)
H04R 27/00       (2006.01)

(52) U.S. Cl.
CPC ............ *H04R 3/02* (2013.01); *H04R 3/04* (2013.01); *H04R 27/00* (2013.01); *H04R 2227/007* (2013.01)

(58) Field of Classification Search
CPC . H04R 3/02; H04R 3/04; H04R 27/00; H04R 2227/007
See application file for complete search history.

(56) References Cited

U.S. PATENT DOCUMENTS 5,263,019 A * 11/1993 Chu .................. H04R 3/02
                                                370/290
5,305,307 A *  4/1994 Chu .................. H04R 3/02
                                                379/406.05
(Continued)

FOREIGN PATENT DOCUMENTS

EP     1675374 B1    8/2010
JP     201987815 A   6/2019

OTHER PUBLICATIONS

International Search Report and Written Opinion issued in corresponding International Patent Application No. PCT/JP2020/026906 (with English translation of International Search Report) dated Oct. 13, 2020 (5 pages).

(Continued)

*Primary Examiner* — Oyesola C Ojo
(74) *Attorney, Agent, or Firm* — Kilyk & Bowersox, P.L.L.C.

(57) ABSTRACT

An object is to provide a public address device that effectively prevents occurrence of howling without a drop of the gain. A public address device 100 includes: a loudspeaker 1 that generates a reproduced sound on the basis of a loudspeaker driving signal u(n); a microphone 2 that collects the reproduced sound and an input sound v(n) to generate a microphone-collected-sound signal y(n); a first filter 301 that generates, on the basis of the loudspeaker driving signal u(n), a pseudo echo signal e(n); an echo-cancelling unit 302 that obtains a difference between the microphone-collected-sound signal y(n) and the pseudo echo signal e(n) to generate an echo-cancelled signal d(n); a second filter 311 that whitens the input sound v(n) included in the loudspeaker driving signal u(n); a third filter 312 that whitens the input sound v(n) included in the microphone-collected-sound signal y(n); a first adaptive filter 313 that uses, as a reference signal, an output signal output from the second filter 311, (Continued)

and uses, as a desired signal, an output signal output from the third filter 311, and estimates a propagation characteristic Wo from the loudspeaker 1 to the microphone 2; a unit that repeatedly updates a filter coefficient W of the first filter 301 on the basis of a filter coefficient W identified by the first adaptive filter 313; and a frequency shifting unit 32 that performs a frequency shift on the echo-cancelled signal d(n) to generate the loudspeaker driving signal u(n).

3 Claims, 3 Drawing Sheets

(56) References Cited

U.S. PATENT DOCUMENTS

| | | | |
|---|---|---|---|
| 6,868,157 B1* | 3/2005 | Okuda | H04B 3/23 |
| | | | 379/406.01 |
| 8,996,365 B2 | 3/2015 | Yamaguchi | |
| 10,819,857 B1* | 10/2020 | Chu | G10L 21/0208 |
| 2003/0081762 A1* | 5/2003 | Zad Issa | H04M 9/082 |
| | | | 379/406.01 |
| 2006/0251261 A1* | 11/2006 | Christoph | H04R 3/04 |
| | | | 381/1 |
| 2006/0291681 A1* | 12/2006 | Klinkby | H04R 25/453 |
| | | | 381/318 |
| 2008/0267378 A1* | 10/2008 | Janse | H04M 9/08 |
| | | | 379/202.01 |
| 2009/0262950 A1* | 10/2009 | Farhang | H04R 3/005 |
| | | | 381/66 |
| 2012/0320471 A1* | 12/2012 | Supino | G11B 5/5582 |
| | | | 360/75 |
| 2015/0163593 A1* | 6/2015 | Florencio | G10L 21/0208 |
| | | | 381/92 |
| 2016/0173165 A1* | 6/2016 | Choi | H04B 1/525 |
| | | | 455/78 |
| 2016/0180858 A1* | 6/2016 | Breebaart | G10L 19/26 |
| | | | 704/504 |
| 2019/0028818 A1* | 1/2019 | Hiruma | H04R 25/505 |
| 2019/0043515 A1* | 2/2019 | Cohen | H04R 3/005 |

OTHER PUBLICATIONS

Extended European Search Report issued in corresponding European Patent Application 20944420.7 dated Feb. 26, 2024 (10 pages).
Puder et al., "Decorrelation Measures for Stabilizing Adaptive Feedback Cancellation in Hearing Aids," 25th European Signal Processing Conference (EUSIPCO), 2017, pp. 583-587.

* cited by examiner

PUBLIC ADDRESS DEVICE, HOWLING SUPPRESSION DEVICE, AND HOWLING SUPPRESSION METHOD

This application is a National Stage Application of PCT/JP2020/026906, filed Jul. 9, 2020.

TECHNICAL FIELD

The present invention relates to a public address device, a howling suppression device, and a howling suppression method, and more particularly to an improvement in a public address device including a loudspeaker and a microphone arranged in the same acoustic space.

BACKGROUND ART

In a public address device including a loudspeaker and a microphone arranged in the same acoustic space, a reproduced sound output from the loudspeaker reaches the microphone and becomes an echo sound. It is known that when the loop gain of such an echo sound exceeds one, howling occurs.

Some known conventional public address devices include a notch filter in a signal processing unit to which a loudspeaker and a microphone are connected, to suppress the echo sound. The notch filter is a band-stop filter that blocks, in a narrow frequency band, passage of a signal. When the frequency of an echo sound is within the blocking band of the notch filter, the notch filter suppresses the echo sound to prevent occurrence of howling. However, in other bands, the notch filter does not block an echo sound, and does not prevent occurrence of howling. In addition, when the blocking bandwidth is widened, there is a problem that the gain of the public address device drops.

In addition, some known conventional public address devices suppress the echo sound using a feedback canceller (for example, Patent Literature 1 and 2).

FIG. 3 is a diagram illustrating a configuration example of a conventional public address device 200 including a feedback canceller 30. A loudspeaker driving signal u(n) is input into a loudspeaker 1 via a digital-to-analog (D/A) converter 11 and a loudspeaker amplifier 12, and the loudspeaker 1 outputs a reproduced sound to an acoustic space 4. A microphone 2 collects sounds in the acoustic space to generate a microphone-collected-sound signal y(n) via a microphone amplifier 21 and an analog-to-digital (A/D) converter 22.

The loudspeaker 1 and the microphone 2 are arranged in the same acoustic space. Therefore, the microphone-collected-sound signal y(n) includes an echo sound x(n) entering the microphone 2 from the loudspeaker 1, and another input sound v(n).

The feedback canceller 30 includes a first filter 301 and an echo-cancelling unit 302. The first filter 301 uses a filter coefficient W to obtain a pseudo echo signal e(n)=W*u(n) from the loudspeaker driving signal u(n), and the echo-cancelling unit 302 subtracts the pseudo echo signal e(n) from the microphone-collected-sound signal y(n) to obtain an echo-cancelled signal d(n). The echo-cancelled signal d(n) is delayed in a delaying unit 33 to become a new loudspeaker driving signal u(n).

When the filter coefficient W matches a propagation characteristic Wo from the loudspeaker 1 to the microphone 2, the feedback canceller 30 suppresses the echo sound x(n) included in the microphone-collected-sound signal y(n) to prevent occurrence of howling. Therefore, it is important to obtain the filter coefficient W that matches the propagation characteristic Wo.

CITATION LIST

Patent Literature

Patent Literature 1: WO 2010/106820 A
Patent Literature 2: EP 1675374 A

SUMMARY OF INVENTION

Technical Problem

The propagation characteristic Wo varies with a lapse of time even in use of the public address device 200. Therefore, it is necessary to repeatedly estimate the propagation characteristic Wo using an applied filter and repeatedly update the filter coefficient W of the feedback canceller 30 on the basis of an identified filter coefficient.

In addition, there is a strong correlation between the input sound v(n) and the loudspeaker driving signal u(n). Therefore, the estimation of the propagation characteristic Wo using the adaptive filter has a problem of occurrence of a bias error caused by the correlation. That is, there is a problem that it is difficult to identify an appropriate filter coefficient W on the basis of the loudspeaker driving signal u(n) and the microphone-collected-sound signal y(n).

Therefore, it is considered that a linear prediction of an input sound v(n) is performed, and the input sound v(n) included in both a loudspeaker driving signal u(n) and a microphone-collected-sound signal y(n) is whitened to make the input sound v(n) and the loudspeaker driving signal u(n) uncorrelated, and then a propagation characteristic Wo is estimated using an adaptive filter, so that an appropriate filter coefficient W is identified.

However, in a case where this method is adopted, in a case where an input sound v(n) includes only a single frequency component, such as a case where an input sound v(n) is a sine wave, the input sound v(n) cannot be whitened using the filter. As a result, there is a problem that a correlation occurs between an input sound v(n) and a loudspeaker driving signal u(n), and a bias error occurs in an identified filter coefficient W. That is, there is a problem that howling is not stably suppressed.

The present invention has been made in view of the above circumstances, and an object of the present invention is to provide a public address device that suppresses howling without a drop of the gain. In addition, another object of the present invention is to provide a public address device that stably suppresses howling. Furthermore, another object of the present invention is to provide a howling restriction device and a howling restriction method applicable to such a public address device.

Solution to Problem

A public address device according to a first aspect of the present invention includes: a loudspeaker that generates a reproduced sound on the basis of a loudspeaker driving signal, and outputs the reproduced sound to an acoustic space; a microphone that collects, from the acoustic space, the reproduced sound and an input sound to generate a microphone-collected-sound signal; a first filter that generates, on the basis of the loudspeaker driving signal, a pseudo echo signal corresponding to an echo sound that is the reproduced sound reaching the microphone; an echo-cancelling unit that obtains a difference between the microphone-collected-sound signal and the pseudo echo signal to generate an echo-cancelled signal; a second filter that whitens the input sound included in the loudspeaker driving signal; a third filter that whitens the input sound included in the microphone-collected-sound signal; a first adaptive filter that uses, as a reference signal, an output signal output from the second filter, uses, as a desired signal, an output signal output from the third filter, and estimates a propagation characteristic from the loudspeaker to the microphone in the acoustic space; a unit that repeatedly updates a filter coefficient of the first filter on the basis of a filter coefficient identified by the first adaptive filter; and a time-varying processing unit that performs time-varying processing on the echo-cancelled signal to generate the loudspeaker driving signal.

Such a configuration is adopted, so that the first adaptive filter estimates the propagation characteristic from the loudspeaker to the microphone in the acoustic space, and on the basis of the filter coefficient identified by the first adaptive filter, the filter coefficient of the first filter is updated. Therefore, even in a case where the propagation characteristic varies in use of the public address device, howling is suppressed according to the variation.

In addition, the first adaptive filter uses, as the reference signal, the loudspeaker driving signal whose input sound has been whitened, and uses, as the desired signal, the microphone-collected-sound signal whose input sound has been whitened, and estimates the propagation characteristic from the loudspeaker to the microphone in the acoustic space. Therefore, occurrence of a bias error caused by the correlation between the loudspeaker driving signal and the input sound is restricted to identify a more appropriate filter coefficient. Therefore, howling is effectively suppressed.

In addition, the time-varying processing unit performs the time-varying processing on the echo-cancelled signal to generate the loudspeaker driving signal, and thus, for example, even in a case where the input sound includes only a specific frequency component, and the loudspeaker driving signal and the input sound cannot be made uncorrelated, the correlation between the loudspeaker driving signal and the input sound is reduced to restrict the occurrence of a bias error. Therefore, howling is stably suppressed.

A public address device according to a second aspect of the present invention may further include: in addition to the above configuration, a second adaptive filter that refers to the echo-cancelled signal to identify a filter coefficient that whitens the input sound; and a unit that repeatedly updates filter coefficients of the second filter and the third filter on the basis of the filter coefficient identified by the second adaptive filter.

Such a configuration is adopted, so that the filter coefficients of the second filter and the third filter are repeatedly updated on the basis of the filter coefficient identified by the second adaptive filter. Therefore, even in a case where the input sound varies, howling is suppressed according to the variation.

In a public address device according to a third aspect of the present invention, in addition to the above configuration, the time-varying processing unit may be a frequency-shift-processing unit that shifts a frequency of the echo-cancelled signal to generate the loudspeaker driving signal.

In a public address device according to a fourth aspect of the present invention, in addition to the above configuration, the time-varying processing unit may be a phase-shift-processing unit that shifts a phase of the echo-cancelled signal to generate the loudspeaker driving signal.

A public address device according to a fifth aspect of the present invention is a howling suppression device for generating, using a first filter, on the basis of a loudspeaker driving signal, a pseudo echo signal corresponding to an echo sound propagated from a loudspeaker to a microphone via an acoustic space, and, on the basis of the pseudo echo signal, removing the echo sound from a microphone-collected-sound signal generated by collecting, from the acoustic space, the echo sound and an input sound, to generate the loudspeaker driving signal. The howling suppression device includes: a second filter that whitens the input sound included in the loudspeaker driving signal; a third filter that whitens the input sound included in the microphone-collected-sound signal; a first adaptive filter that uses, as a reference signal, an output signal output from the second filter, uses, as a desired signal, an output signal output from the third filter, and estimates a propagation characteristic from the loudspeaker to the microphone in the acoustic space; a unit that repeatedly updates a filter coefficient of the first filter on the basis of a filter coefficient identified by the first adaptive filter; and a time-varying processing unit that performs time-varying processing on the echo-cancelled signal to generate the loudspeaker driving signal.

A public address device according to a sixth aspect of the present invention may further include: in addition to the above configuration, a second adaptive filter that refers to the echo-cancelled signal to identify a filter coefficient that whitens the input sound; and a unit that repeatedly updates filter coefficients of the second filter and the third filter on the basis of the filter coefficient identified by the second adaptive filter.

A howling suppression method according to a seventh aspect of the present invention is a howling suppression method for generating, using a first filter, on the basis of a loudspeaker driving signal, a pseudo echo signal corresponding to an echo sound propagated from a loudspeaker to a microphone via an acoustic space, and, on the basis of the pseudo echo signal, removing the echo sound from a microphone-collected-sound signal generated by collecting, from the acoustic space, the echo sound and an input sound, to generate the loudspeaker driving signal. The howling suppression method includes: using a second filter to whiten the input sound included in the loudspeaker driving signal; using a third filter to whiten the input sound included in the microphone-collected-sound signal; using a first adaptive filter to use, as a reference signal, an output signal output from the second filter, to use, as a desired signal, an output signal output from the third filter, and to estimate a propagation characteristic from the loudspeaker to the microphone in the acoustic space; repeatedly updating a filter coefficient of the first filter on the basis of a filter coefficient identified by the first adaptive filter; and performing time-varying processing on the echo-cancelled signal to generate the loudspeaker driving signal.

A howling suppression method according to an eighth aspect of the present invention may further include: in addition to the above configuration, using a second adaptive filter to refer to the echo-cancelled signal to identify a filter coefficient that whitens the input sound; and repeatedly updating filter coefficients of the second filter and the third filter on the basis of the filter coefficient identified by the second adaptive filter.

Effects of Invention

According to the present invention, provided is a public address device that suppresses howling without a drop of the gain. In addition, provided is a public address device that stably suppresses howling. Furthermore, provided are a howling restriction device and a howling restriction method applicable to such a public address device.

DESCRIPTION OF EMBODIMENTS

Figure 1:
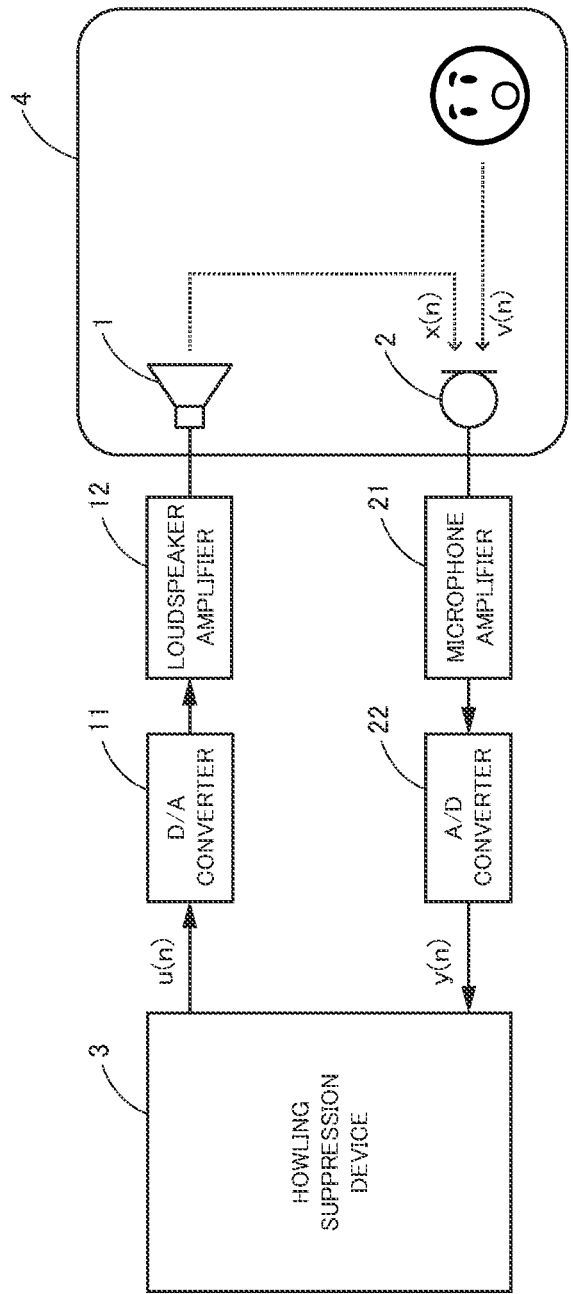
FIG. 1 is a block diagram illustrating a configuration example of a public address device 100 according to an embodiment of the present invention.

FIG. 1 is a block diagram illustrating a configuration example of a public address device 100 according to an embodiment of the present invention. The public address device 100 includes a loudspeaker 1, a digital-to-analog (D/A) converter 11, a loudspeaker amplifier 12, a microphone 2, a microphone amplifier 21, an analog-to-digital (A/D) converter 22, and a howling suppression device 3.

The loudspeaker 1 is a unit that converts a loudspeaker driving signal u(n) into a sound, and outputs the sound to an acoustic space 4. The loudspeaker driving signal u(n) is a digital signal at discrete times n, and includes sound information to be output from the loudspeaker 1. The loudspeaker driving signal u(n) is converted into an analog sound signal by the D/A converter 11, and amplified by the loudspeaker amplifier 12, and then converted into a sound by the loudspeaker 1, and output, as a reproduced sound, to the acoustic space 4.

The microphone 2 is a unit that converts sounds collected in the acoustic space 4, into a microphone-collected-sound signal y(n). The microphone-collected-sound signal y(n) is a digital sound signal at discrete times n, and includes sound information collected by the microphone 2. The analog sound signal output from the microphone 2 is amplified by the microphone amplifier 21, and converted into a digital signal by the A/D converter 22 to become a microphone-collected-sound signal y(n).

The loudspeaker 1 and the microphone 2 are arranged in the same acoustic space 4. Therefore, the microphone-collected-sound signal y(n) includes a reproduced sound that has been output from the loudspeaker 1, propagated through the acoustic space 4, and reached the microphone 2. That is, the microphone-collected-sound signal y(n) includes an echo sound x(n) corresponding to the reproduced sound that has entered the microphone 2 from the loudspeaker 1, and an input sound v(n) corresponding to a sound generated in the acoustic space except the reproduced sound. The input sound v(n) is a sound to be magnified by the public address device 100, and is an additive disturbance signal to be added to the echo sound x(n).

Assuming that Wo is the propagation characteristic, in the acoustic space, until input, as an echo sound x(n), into the microphone 2, of a reproduced sound output from the loudspeaker 1 on the basis of a loudspeaker driving signal u(n), the echo sound x(n) and the microphone-collected-sound signal y(n) are expressed as the following equations.

$$x(n)=Wo*u(n) \qquad \text{[Expression 1]}$$

$$y(n)=x(n)+v(n)=Wo*u(n)+v(n)$$

"*" represents a convolution operation.

The howling suppression device 3 is a digital processing unit that suppresses howling by suppressing an echo sound x(n) included in a microphone-collected-sound signal y(n). As the howling suppression device 3, a digital signal processor (DSP) is used, for example. On the basis of an input microphone-collected-sound signal y(n), the howling suppression device 3 generates a new loudspeaker driving signal u(n).

Figure 2:
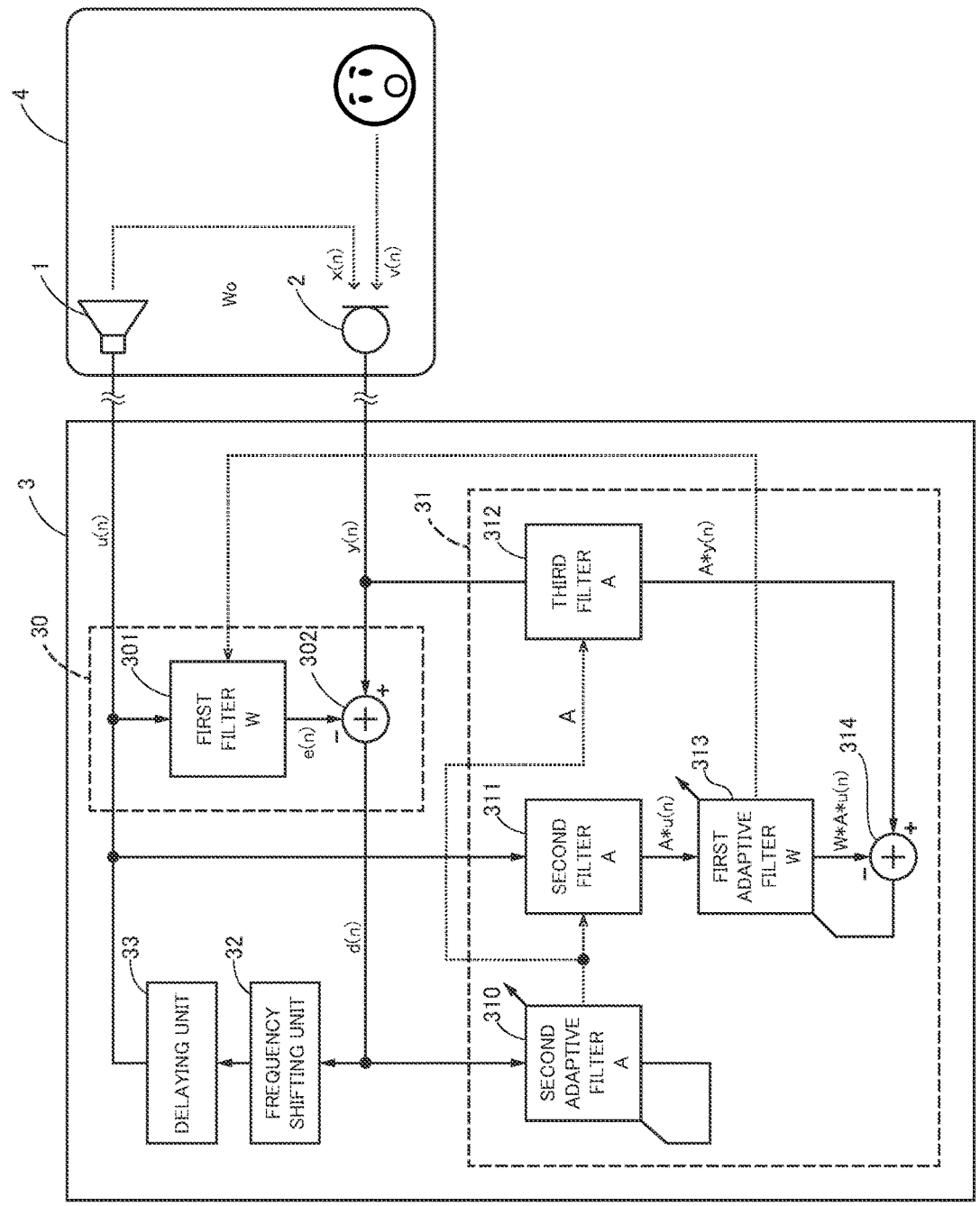
FIG. 2 is a block diagram illustrating an example of a detailed configuration of the howling suppression device 3 of FIG. 1.
Figure 3:
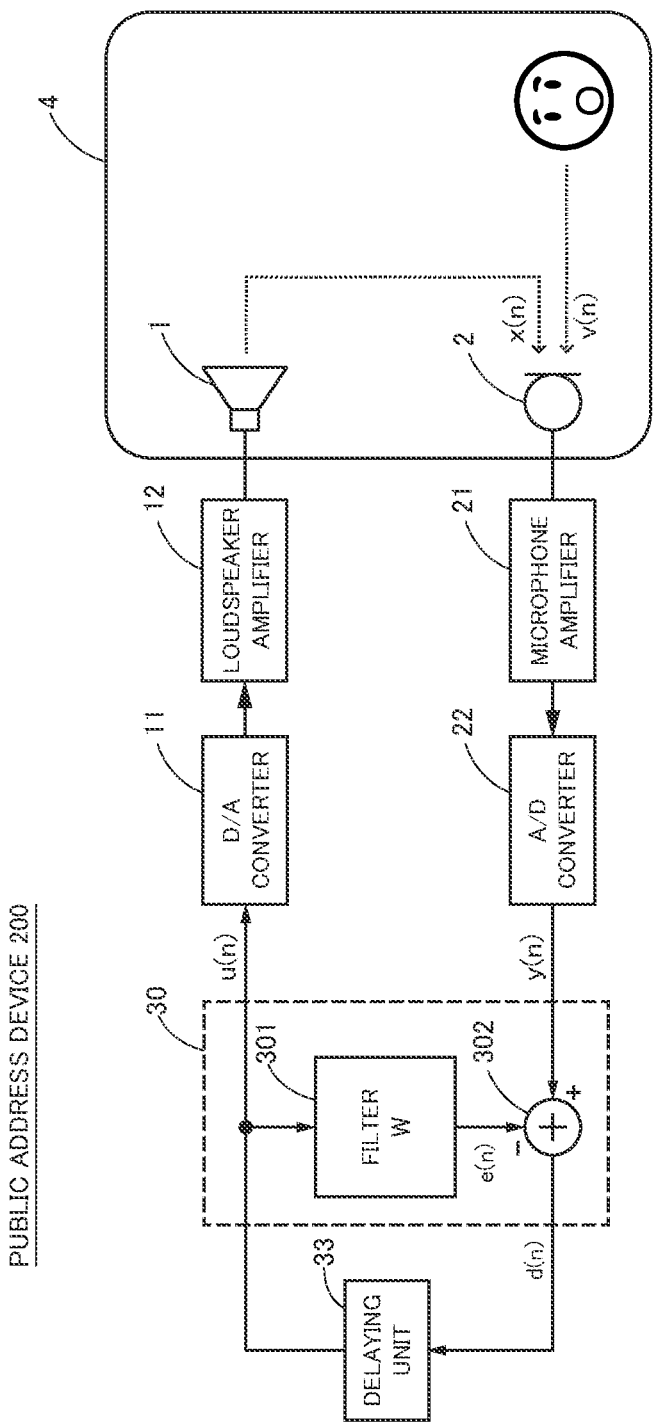
FIG. 3 is a diagram illustrating a configuration example of a conventional public address device 200 including a feedback canceller 30.

FIG. 2 is a block diagram illustrating an example of a detailed configuration of the howling suppression device 3 of FIG. 1. The howling suppression device 3 includes a feedback canceller 30, a filter identification unit 31, a frequency shifting unit 32, and a delaying unit 33.

The feedback canceller 30 is a processing unit that suppresses an echo sound x(n) included in a microphone-collected-sound signal y(n) on the basis of a loudspeaker driving signal u(n) to generate an echo-cancelled signal d(n). The feedback canceller 30 includes a first filter 301 and an echo-cancelling unit 302.

The first filter 301 is a finite impulse response (FIR) filter that estimates an echo sound x(n), and uses a filter coefficient W to obtain a pseudo echo signal e(n)=W*u(n) from a loudspeaker driving signal u(n). The echo-cancelling unit 302 is a difference calculation processing unit that subtracts the pseudo echo signal e(n) from a microphone-collected-sound signal y(n). The echo-cancelling unit 302 generates an echo-cancelled signal d(n)=y(n)−e(n) as a microphone-collected-sound signal y(n) in which an echo sound x(n) has been suppressed.

When the filter coefficient W matches a propagation characteristic Wo from the loudspeaker 1 to the microphone 2, the pseudo echo signal e(n) matches the echo sound x(n), and only an input sound v(n) is output from the echo-cancelling unit 302. That is, the feedback canceller 30 suppresses the echo sound x(n) to prevent occurrence of howling. Therefore, in order to prevent howling, it is important to make the filter coefficient W match the propagation characteristic Wo.

The propagation characteristic Wo varies according to a variation in the environment in the acoustic space, and varies with a lapse of time even in use of the public address device 100. In order to follow such a variation in the propagation characteristic Wo, a filter coefficient W identified by the filter identification unit 31 is used as a filter coefficient W of the feedback canceller 30. The filter identification unit 31 repeatedly identifies the filter coefficient W, and the first filter 301 repeatedly performs processing to update the filter coefficient using the identified filter coefficient W.

The filter identification unit 31 is a processing unit that estimates the propagation characteristic Wo to identify the filter coefficient W. The filter identification unit 31 includes a second adaptive filter 310, a second filter 311, a third filter 312, a first adaptive filter 313, and a subtraction unit 314.

The second adaptive filter 310 is a linear predictor that identifies a filter coefficient A that whitens an echo-cancelled signal d(n). A reference signal of the second adaptive filter 310 is an echo-cancelled signal d(n) output from the feedback canceller 30. An error signal of the second adaptive filter 310 is an output signal output from the second adaptive filter 310. Therefore, a filter coefficient that minimizes the error signal is obtained, so that the filter coefficient A that converts the echo-cancelled signal d(n) into white noise is identified. Assuming that the filter coefficient W of the first filter 301 matches the propagation characteristic Wo, an echo-cancelled signal d(n) matches an input sound v(n), and the filter coefficient A becomes a coefficient of a whitening filter that whitens the input sound v(n).

Each of the second filter 311 and the third filter 312 is an FIR filter using the filter coefficient A identified by the second adaptive filter 310. Each of the second filter 311 and the third filter 312 whitens an input sound v(n). A loudspeaker driving signal u(n) is input into the second filter 311, and the second filter 311 whitens an input sound v(n) included in the loudspeaker driving signal u(n) to generate a signal A*u(n). On the other hand, a microphone-collected-sound signal y(n) is input into the third filter 312, and the third filter 312 whitens an input sound v(n) included in the microphone-collected-sound signal y(n) to generate a signal A*y(n).

In order to follow the variation in the input sound v(n), the second adaptive filter 310 repeatedly identifies the filter coefficient A, and the second filter 311 and the third filter 312 repeatedly perform processing to update the filter coefficients using the identified filter coefficient A.

The first adaptive filter 313 is a unit that estimates the propagation characteristic Wo to identify the filter coefficient W. A reference signal of the first adaptive filter 313 is an output signal A*u(n) output from the second filter 311. A desired signal of the first adaptive filter 313 is an output signal A*y(n) output from the third filter 312. The subtraction unit 314 is a difference calculation processing unit that subtracts, from the desired signal A*y(n), an output signal W*A*u(n) output from first adaptive filter 313, and the calculation result is input, as an error signal, into the first adaptive filter 313.

The desired signal of the first adaptive filter 313 is a microphone-collected-sound signal A*y(n) whose input sound v(n) has been whitened, and is expressed as the following equations.

$$A*y(n) = A*\{x(n) + v(n)\}$$ [Expression 2]
$$= A*\{Wo*u(n) + v(n)\}$$
$$= Wo*\{A*u(n)\} + \{A*v(n)\}$$

That is, the first adaptive filter 313 is provided with A*u(n) as the reference signal, and Wo*{A*u(n)}+{A*v(n)} as the desired signal. Both A*u(n) and A*v(n) are signals whitened with the filter coefficient A. Therefore, when the input sound v(n) is completely whitened, even if there is a strong correlation between u(n) and v(n), A*u(n) and A*v(n) are made uncorrelated. Therefore, the first adaptive filter 313 estimates the propagation characteristic Wo from the loudspeaker 1 to the microphone 2 while restricting occurrence of a bias error caused by the correlation between u(n) and v(n), to identify an appropriate filter coefficient W.

The frequency shifting unit 32 is a processing unit that shifts the frequency of an echo-cancelled signal d(n), and the shift amount thereof is predefined. The frequency of an echo-cancelled signal d(n) is shifted by the frequency shifting unit 32, and delayed by the delaying unit 33, so that the echo-cancelled signal d(n) becomes a new loudspeaker driving signal u(n). The frequency shift is performed to restrict occurrence of a bias error in a case where an input sound v(n) is a periodic signal, such as a sine wave.

In a case where the frequency shift is not performed, when an input sound v(n) is a sine wave, the second filter 311 and the third filter 312 cannot completely whiten the input sound v(n). White noise is a signal having frequency components in the entire band, whereas a sine wave is a signal having no frequency component in a band other than a specific band. Therefore, in a case where an input sound v(n) is a sine wave, the second filter 311 and the third filter 312 cannot whiten the input sound v(n), and thus A*u(n) and A*v(n) cannot be made uncorrelated. As a result, according to the correlation between A*u(n) and A*v(n), a bias error occurs in a filter coefficient W identified by the first adaptive filter 313.

In contrast, the frequency shifting unit 32 is provided to perform a frequency shift of an echo-cancelled signal d(n) to generate a loudspeaker driving signal u(n), so that even if an input sound v(n) is a sine wave, input signals input into the second filter 311 and the third filter 312 have a plurality of frequency components, and the correlation between A*u(n) and A*v(n) is reduced.

In this case, even if A*u(n) and A*v(n) cannot be made completely uncorrelated, the frequency shifts for each loop, the bands of input signals input into the second filter 311 and the third filter 312 are widened, and the bias error of the filter coefficient W is decreased. Therefore, even in a case where an input sound v(n) is, for example, only an air-conditioning sound and includes a sine wave, the occurrence of a bias error in identification of the filter coefficient W is restricted to stably suppress howling.

It is considered that in a case where a sufficient shift amount is secured, the frequency shift itself has an effect of suppressing howling. However, it is considered an increase in the shift amount of the frequency shift makes the listeners feel uncomfortable.

In contrast, it is considered that in a case where a purpose of the frequency shifting unit 32 is to reduce the correlation between A*u(n) and A*v(n), it is sufficient if the shift amount is an extremely small value. Therefore, the occurrence of howling is prevented without making the listeners staying in the acoustic space 4 feel very uncomfortable. Experiments by the inventors show that it is sufficient if the frequency shift is a slight shift amount of, for example, about 4 Hz. The shift amount of the frequency shifting unit 32 is set to, for example, 20 Hz or less, and is more desirably 10 Hz or less.

Since the frequency shifting unit 32 is to reduce the correlation between A*u(n) and A*v(n), the frequency shifting unit 32 may be replaced with a processing unit that performs time-varying processing except the frequency shift. For example, instead of the frequency shifting unit 32, a phase-shift-processing unit that performs a phase shift may be adopted. The time-varying processing is processing in which a transfer function is represented as a function of time.

DESCRIPTION OF REFERENCE NUMERALS 100 public address device
1 loudspeaker
2 microphone
3 howling suppression device
4 acoustic space
11 D/A converter
12 loudspeaker amplifier
21 microphone amplifier
22 A/D converter
30 feedback canceller
31 filter identification unit
32 frequency shifting unit
33 delaying unit
301 first filter 302 echo-cancelling unit
310 second adaptive filter
311 second filter
312 third filter
313 first adaptive filter
314 subtraction unit
A, W filter coefficient
Wo propagation characteristic
d(n) echo-cancelled signal
e(n) pseudo echo signal
u(n) loudspeaker driving signal
v(n) input sound
x(n) echo sound
y(n) microphone-collected-sound signal

The invention claimed is:

1. A public address device comprising:
a loudspeaker that generates a reproduced sound on a basis of a loudspeaker driving signal, and outputs the reproduced sound to an acoustic space;
a microphone that collects, from the acoustic space, the reproduced sound and an input sound to generate a microphone-collected-sound signal;
a first filter that generates, on a basis of the loudspeaker driving signal, a pseudo echo signal corresponding to an echo sound that is the reproduced sound reaching the microphone;
an echo-cancelling unit that obtains a difference between the microphone-collected-sound signal and the pseudo echo signal to generate an echo-cancelled signal;
a second filter that whitens the input sound included in the loudspeaker driving signal;
a third filter that whitens the input sound included in the microphone-collected-sound signal;
a first adaptive filter that uses, as a reference signal, an output signal output from the second filter, uses, as a desired signal, an output signal output from the third filter, and estimates a propagation characteristic from the loudspeaker to the microphone in the acoustic space;
a unit that repeatedly updates a filter coefficient of the first filter on a basis of a filter coefficient identified by the first adaptive filter;
a time-varying processing unit that shifts a frequency or a phase of the echo-cancelled signal to generate the loudspeaker driving signal;
a second adaptive filter that refers to the echo-cancelled signal to identify a filter coefficient that whitens the input sound; and
a unit that repeatedly updates filter coefficients of the second filter and the third filter on a basis of the filter coefficient identified by the second adaptive filter.

2. A howling suppression device for generating, using a first filter, on a basis of a loudspeaker driving signal, a pseudo echo signal corresponding to an echo sound propagated from a loudspeaker to a microphone via an acoustic space, and, on a basis of the pseudo echo signal, removing the echo sound from a microphone-collected-sound signal generated by collecting, from the acoustic space, the echo sound and an input sound, to generate the loudspeaker driving signal, the howling suppression device comprising:
a second filter that whitens the input sound included in the loudspeaker driving signal;
a third filter that whitens the input sound included in the microphone-collected-sound signal;
a first adaptive filter that uses, as a reference signal, an output signal output from the second filter, uses, as a desired signal, an output signal output from the third filter, and estimates a propagation characteristic from the loudspeaker to the microphone in the acoustic space;
a unit that repeatedly updates a filter coefficient of the first filter on a basis of a filter coefficient identified by the first adaptive filter;
a time-varying processing unit that shifts a frequency or a phase of the echo-cancelled signal to generate the loudspeaker driving signal;
a second adaptive filter that refers to the echo-cancelled signal to identify a filter coefficient that whitens the input sound; and
a unit that repeatedly updates filter coefficients of the second filter and the third filter on a basis of the filter coefficient identified by the second adaptive filter.

3. A howling suppression method for generating, using a first filter, on a basis of a loudspeaker driving signal, a pseudo echo signal corresponding to an echo sound propagated from a loudspeaker to a microphone via an acoustic space, and, on a basis of the pseudo echo signal, removing the echo sound from a microphone-collected-sound signal generated by collecting, from the acoustic space, the echo sound and an input sound, to generate the loudspeaker driving signal, the howling suppression method comprising:
using a second filter to whiten the input sound included in the loudspeaker driving signal;
using a third filter to whiten the input sound included in the microphone-collected-sound signal;
using a first adaptive filter to use, as a reference signal, an output signal output from the second filter, to use, as a desired signal, an output signal output from the third filter, and to estimate a propagation characteristic from the loudspeaker to the microphone in the acoustic space;
repeatedly updating a filter coefficient of the first filter on a basis of a filter coefficient identified by the first adaptive filter;
shifting a frequency or a phase of the echo-cancelled signal to generate the loudspeaker driving signal;
using a second adaptive filter to refer to the echo-cancelled signal to identify a filter coefficient that whitens the input sound; and
repeatedly updating filter coefficients of the second filter and the third filter on a basis of the filter coefficient identified by the second adaptive filter.

* * * * *